(12) United States Patent
Djordjevic et al.

(10) Patent No.: US 9,036,992 B2
(45) Date of Patent: May 19, 2015

(54) LDPC-CODED MODULATION FOR ULTRA-HIGH-SPEED OPTICAL TRANSPORT IN THE PRESENCE OF PHASE NOISE

(71) Applicant: NEC Laboratories America, Inc., Princeton, NJ (US)

(72) Inventors: Ivan B. Djordjevic, Tucson, AZ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 101 days.

(21) Appl. No.: 13/903,508

(22) Filed: May 28, 2013

(65) Prior Publication Data

US 2014/0099103 A1 Apr. 10, 2014

Related U.S. Application Data

(60) Provisional application No. 61/711,287, filed on Oct. 9, 2012.

(51) Int. Cl.
*H04B 10/08* (2006.01)
*H04B 17/00* (2006.01)
(Continued)

(52) U.S. Cl.
CPC .......... *H04B 10/2507* (2013.01); *H04B 10/616* (2013.01); *H04B 10/6165* (2013.01)

(58) Field of Classification Search
CPC ... H04L 1/00; H04L 2001/00; H04L 2201/00; H04L 2203/00; H03M 1/00; H03M 2201/00; H04B 1/00; H04B 2001/00; H04B 2201/00; H04B 2203/00; H04B 2215/00; H04B 10/2507; H04B 10/616; H04B 10/6165
USPC ................................ 398/25, 79, 65, 149, 184
See application file for complete search history.

(56) References Cited

U.S. PATENT DOCUMENTS 6,801,721 B1 * 10/2004 Madsen ........................ 398/147
7,986,753 B1 * 7/2011 Roy et al. ...................... 375/341
(Continued)

FOREIGN PATENT DOCUMENTS

WO   WO 2007062021 A2 *  5/2007
WO       2007-066984 A1    6/2007
WO   WO 2007062021 A3 * 10/2007

OTHER PUBLICATIONS

Djordjevic, I.B.; Cvijetic, M.; Lei Xu; Ting Wang, "Proposal for Beyond 100-Gb/s Optical Transmission Based on Bit-Interleaved LDPC-Coded Modulation," Photonics Technology Letters, IEEE , vol. 19, No. 12, pp. 874,876, Jun. 15, 2007.*

(Continued)

*Primary Examiner* — Ken Vanderpuye
*Assistant Examiner* — Abbas H Alagheband
(74) *Attorney, Agent, or Firm* — Joseph Kolodka

(57) ABSTRACT

Methods and systems for decoding a signal include compensating for impairments in a received signal using at least carrier phase estimation, where residual phase error remains after compensation; calculating symbol log-likelihood ratios (LLRs) for symbols in the compensated signal using Monte Carlo integration; demapping the symbols in the compensated signal using the symbol LLRs and extrinsic information from signal decoding to produce one or more estimated codewords; and decoding each estimated codeword with a decoder that generates a decoded codeword and extrinsic information.

14 Claims, 4 Drawing Sheets

(51) Int. Cl.
*H04J 14/02* (2006.01)
*H04J 14/06* (2006.01)
*H04B 10/12* (2006.01)
*H04B 10/04* (2006.01)
*H04B 10/2507* (2013.01)
*H04B 10/61* (2013.01)

(56) References Cited

U.S. PATENT DOCUMENTS

| | | | |
|---|---|---|---|
| 7,992,070 B2 * | 8/2011 | Djordjevic et al. | 714/755 |
| 8,045,604 B2 * | 10/2011 | Farhang-Boroujeny et al. | 375/224 |
| 8,385,439 B2 * | 2/2013 | Djordjevic et al. | 375/260 |
| 2002/0034261 A1 * | 3/2002 | Eidson et al. | 375/298 |
| 2004/0174939 A1 * | 9/2004 | Wang | 375/316 |
| 2007/0041475 A1 * | 2/2007 | Koshy et al. | 375/340 |
| 2007/0116143 A1 * | 5/2007 | Bjerke et al. | 375/262 |
| 2007/0283220 A1 * | 12/2007 | Kim | 714/758 |
| 2008/0075204 A1 * | 3/2008 | Shieh et al. | 375/341 |
| 2008/0153449 A1 * | 6/2008 | Prasad et al. | 455/334 |
| 2008/0163025 A1 * | 7/2008 | Djordjevic et al. | 714/755 |
| 2008/0273632 A1 * | 11/2008 | Farhang-Boroujeny et al. | 375/341 |
| 2008/0317143 A1 * | 12/2008 | Ryoo et al. | 375/260 |
| 2009/0052907 A1 * | 2/2009 | Batshon et al. | 398/182 |
| 2010/0211849 A1 * | 8/2010 | Djordjevic et al. | 714/755 |
| 2010/0215371 A1 * | 8/2010 | Djordevia et al. | 398/79 |
| 2010/0232804 A1 * | 9/2010 | Djordjevic et al. | 398/152 |
| 2011/0103507 A1 * | 5/2011 | Beidas et al. | 375/285 |
| 2012/0051452 A1 * | 3/2012 | Djordjevic et al. | 375/295 |
| 2012/0084617 A1 * | 4/2012 | Djordjevic et al. | 714/752 |
| 2012/0106983 A1 * | 5/2012 | Xu et al. | 398/208 |
| 2013/0091398 A1 * | 4/2013 | Djordjevic et al. | 714/752 |
| 2013/0266095 A1 * | 10/2013 | Jonsson | 375/341 |
| 2014/0079394 A1 * | 3/2014 | Xie et al. | 398/65 |
| 2014/0086594 A1 * | 3/2014 | Xie et al. | 398/208 |

OTHER PUBLICATIONS

Djordjevic, I.B.; Cvijetic, M.; Lei Xu; Ting Wang, "Using LDPC-Coded Modulation and Coherent Detection for Ultra Highspeed Optical Transmission," Lightwave Technology, Journal of, vol. 25, No. 11, pp. 3619,3625, Nov. 2007.*

Colavolpe, G., et al. "Algorithms for Iterative Decoding in the Presence of Strong Phase Noise" IEEE Journal on Selected Areas in Communications, vol. 23, No. 9. Sep. 2005. pp. 1748-1757.

Georghiades, C., et al. "Sequence Estimation in the Presence of Random Parameters Via the EM Algorithm" IEEE Transactions on Communications, vol. 45, No. 3. Mar. 1997. pp. 300-308.

Liu, T., et al. "On the Optimum Signal Constellation Design for High-Speed Optical Transport Networks" Optics Express, vol. 20, No. 19. Aug. 2012. (11 Pages).

Taylor, M. "Phase Estimation Methods for Optical Coherent Detection Using Digital Signal Processing" Journal of Lightwave Technology, vol. 27, No. 7. Apr. 2009. pp. 901-914.

Wang, X., et al. "Blind Turbo Equalization in Gaussian and Impulsive Noise" IEEE Transactions on Vehicular Technology, vol. 50, No. 4. Jul. 2001. pp. 1092-1105.

Xie, C., et al. "Adaptive Carrier Phase Estimation in Coherent Systems" Optical Fiber Communication Conference and Exposition (OFC/NFOEC), 2012 and the National Fiber Optic Engineers Conference. Mar. 2012. pp. 1-3.

Zhao, Y., et al. "Beyond 100G Optical Channel Noise Modeling for Optimized Soft-Decision FEC Performance" Optical Fiber Communication Conference and Exposition (OFC/NFOEC), 2012 and the National Fiber Optic Engineers Conference. Mar. 2012. pp. 1-3.

* cited by examiner

LDPC-CODED MODULATION FOR ULTRA-HIGH-SPEED OPTICAL TRANSPORT IN THE PRESENCE OF PHASE NOISE

RELATED APPLICATION INFORMATION

This application claims priority to provisional application Ser. No. 61/711,287 filed on Oct. 9, 2012, incorporated herein by reference.

BACKGROUND

1. Technical Field

The present invention relates to optical communications and, in particular, to optical communications using Monte Carlo based log likelihood functions for demodulation.

2. Description of the Related Art

A 100 Gb/s Ethernet standard has been approved and is already being implemented. This implementation is expected to accelerate in next few years. At these ultra-high data rates, the performance of fiber-optic communication systems is degraded significantly due to presence of various linear and nonlinear impairments. To deal with those channel impairments modulation and detection have been proposed to compensate.

For one such compensation technique, carrier phase estimation (CPE), the algorithmic DSP-based approaches are highly popular, and can be categorized into two broad categories: data-aided and non-data-aided. The maximum a posteriori approach is particularly efficient in CPE. However, the complexity of such algorithms grows exponentially with the channel memory. Even upon compensation of chromatic dispersion and nonlinearity phase compensation there will be some residual phase error.

SUMMARY

A method for includes compensating for impairments in a received signal using at least carrier phase estimation, wherein residual phase error remains after said compensation; calculating symbol log-likelihood ratios (LLRs) for symbols in the compensated signal using Monte Carlo integration; demapping the symbols in the compensated signal using the symbol LLRs and extrinsic information from signal decoding to produce one or more estimated codewords; and decoding each estimated codeword with a decoder that generates a decoded codeword and extrinsic information.

A receiver includes a compensation module configured to compensate for impairments in a received signal using at least carrier phase estimation, wherein residual phase error remains after said compensation; a symbol log-likelihood module configured to calculate symbol log-likelihood ratios (LLRs) for symbols in the compensated signal using Monte Carlo integration; a demapper configured to demap the symbols in the compensated signal using the symbol LLRs and extrinsic information from signal decoding to produce one or more estimated codewords; and one or more decoders, each configured to decode an estimated codeword and to generate extrinsic information that is fed back to the demapper.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

It has been experimentally verified that, even in beyond-100 Gb/s transmission for non-dispersion managed optical links, the distribution of samples upon compensation of linear and nonlinear impairments is still Gaussian-like with the residual phase error that can properly be modeled as a Markov process. The present principles provide demodulation that calculates symbol likelihoods according to a Monte Carlo method in the presence of residual phase error.

The present principles may be applied to conventional and optimized modulation schemes, 2-D and 4-D signaling schemes, to evaluate their efficiency. Optimized modulation schemes, when used in combination with LDPC coding, are more robust in the presence of phase error than conventional low-density parity check (LDPC) coded quadrature amplitude modulation (QAM). Moreover, LDPC-coded 4-D signaling schemes show much better robustness compared to 2-D coded modulation schemes.

Figure 1:
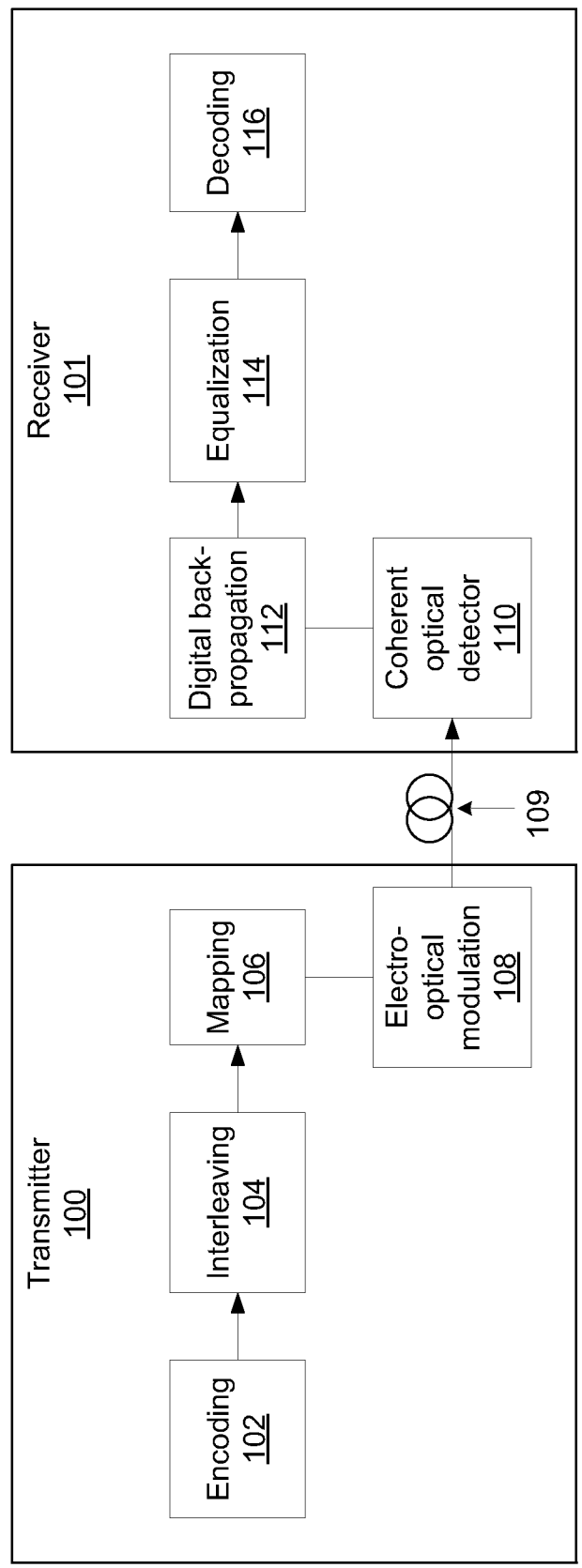
FIG. 1 is a block diagram of an optical transmission/reception system that uses Monte Carlo methods to calculate symbol log-likelihood ratios (LLRs) in accordance with the present principles.

Referring now to the drawings in which like numerals represent the same or similar elements and initially to FIG. 1, an optical communications system is shown that includes a transmitter 100 and a receiver 101. The transmitter encodes a plurality of data signals at the encoder block 102 and then interleaves those signals at interleaving block 104. The mapping block 106 then assigns bits of the interleaved signal to a modulation constellation, associating the bits of the interleaved data signals with the points on, e.g., a four-dimensional constellation. It should be noted that any appropriate modulation scheme may be used.

The transmitter 100 then sends the signal to receiver 101 over an optical medium 109, which may include periodically deployed erbium doped fiber (EDF) amplifiers to maintain the signal strength. Other embodiments include the use of Raman and hybrid Raman/EDF amplifiers. Receiver 101 detects symbols in the constellation generated at block 108. Upon coherent optical detection 110, a backpropagation block 112 and equalization block 114 perform carrier phase estimation and, e.g., turbo equalization using a Monte Carlo log likelihood function to compensate for channel impairments such as polarization mode dispersion, chromatic dispersion, and fiber non-linearities. The signals are then de-interleaved and decoded at block 116 to produce the original data signals.

The encoders 102 and decoders 116 make use of LDPC codes to provide error correction that brings the transmissions close to the channel capacity. Every communications channel has a channel capacity, defined as the maximum information rate that the communication channel can carry within a given bandwidth. LDPC codes employ iterative belief propagation techniques that enable decoding in time that is proportional to their block length.

Figure 2:
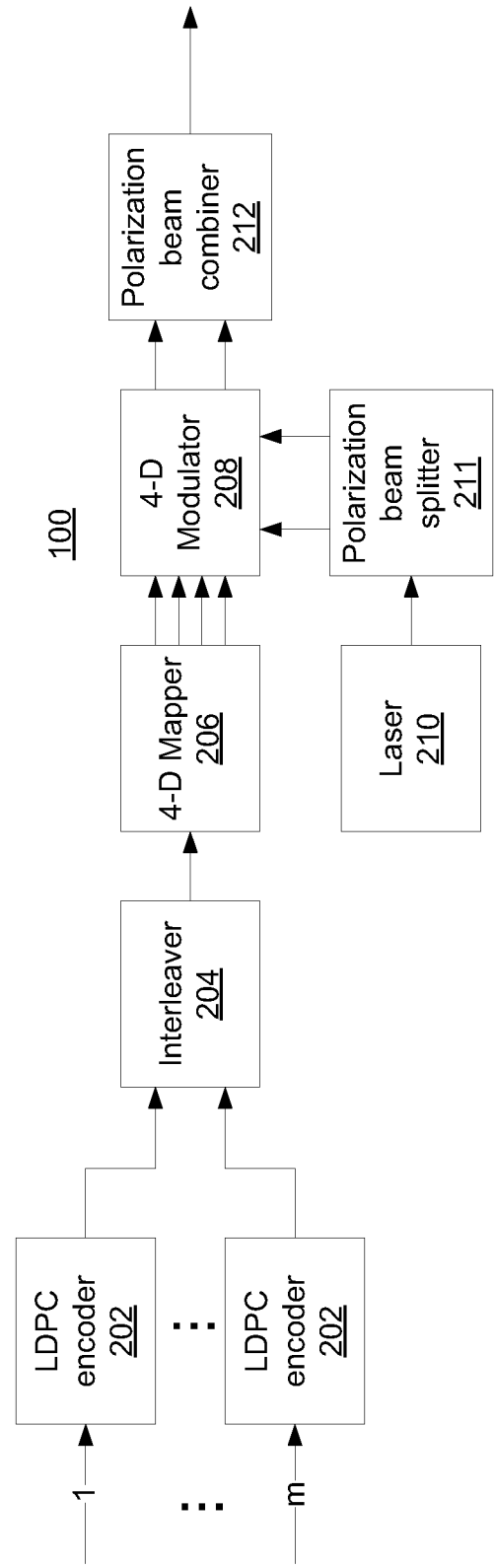
FIG. 2 is a block diagram of an optical transmitter in accordance with the present principles.

Referring now to FIG. 2, a detailed view of transmitter 100 is shown. m data signals feed into the transmitter 100. The data streams are encoded at LDPC encoders 202 using different LDPC codes having code rates R=K/N, where K denotes the number of information symbols used in the binary LDPC code and N denotes the codeword length.

The m input bit streams from m different information sources pass through identical LDPC encoders 202 that use LDPC codes R. The outputs of the encoders 202 are then written row-wise into an m×n block interleaver 204. A column of m bits is read out of the interleaver 204 and sent in one bit-stream, in bits at a time instant i, to a 4-D mapper 206.

The 4-D mapper 206 maps each m bits into four-dimensional signal constellation points based on, e.g., a lookup table and produces four streams of symbol coordinates. The four streams represent, e.g., an in-phase and quadrature signal for each of two orthogonal optical polarizations. The mapper 206 assigns constellation points with the mapped coordinates from the mapper 206 being used as the inputs of a 4-D modulator 208. It should be understood that the mapper block 206 may include digital to analog conversion and pulse shaping functions. The 4-D modulator may be formed with, e.g., two electro-optical I/Q modulators, one per polarization.

A laser 210 produces a laser carrier beam that is split at polarization beam splitter 211 into two orthogonal polarizations. The modulator 208 converts the output of the mapper 206 into the optical domain by modulating the four symbol streams onto the orthogonally polarized carrier beams. The polarized beams are then combined in beam combiner 212 before being transmitted on an optical fiber. Because the combined beams occupy polarizations that are orthogonal with respect to one another, they can be combined without loss of information.

Figure 3:
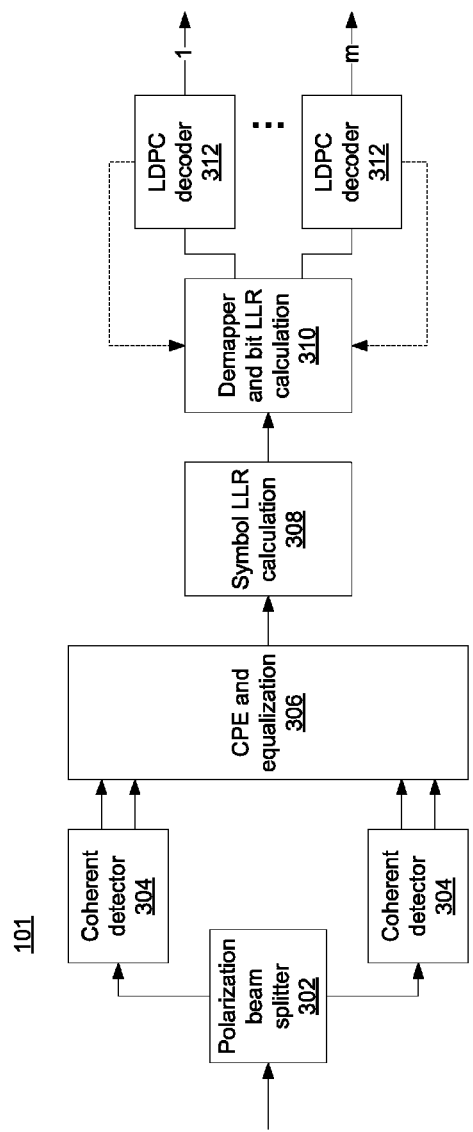
FIG. 3 is a block diagram of an optical reception system that uses Monte Carlo methods to calculate symbol log-likelihood ratios (LLRs) in accordance with the present principles.

Referring now to FIG. 3, a detailed view of the receiver 101 is shown. A carrier beam is received from an optical fiber and is split at beam splitter 302 into two orthogonal polarizations. Coherent detectors 304 detect the beams to produce in-phase and quadrature signal estimates by sampling their respective signals. Although detectors 304 are advantageously implemented as coherent detectors, it is contemplated that other sorts of detector might be used. In embodiments that employ coherent detection, a local laser source (not shown) is used to provide the detectors 304 with a local reference that allows them to distinguish between the orthogonal polarizations and extract the information.

The in-phase and quadrature signals, for each polarization, produced by the detectors 304 are then passed to the equalization module 306, where various channel impairments are corrected. In particular, equalizer 306 performs carrier phase estimation (CPE) and compensation of linear and nonlinear effects by, e.g., reduced-complexity digital backpropagation. The data stream is then passed to a symbol log likelihood ratio (LLR) module 308 that uses a Monte Carlo method, described in greater detail below, to find symbol LLRs. Symbol LLR information is used at demapper 310 to demodulate the signals and determine which constellation symbols are present.

The demapper 310 produces a set of bit LLRs, based on symbol LLRs and extrinsic information obtained from LDPC decoders 312, and passes them to m LDPC decoders 312. To improve bit error rate (BER) performance, extrinsic reliabilities are iterated between the demapper 310 and LDPC decoders 312 in, e.g., turbo equalization fashion until convergence or until a predetermined number of iterations has been reached. The LDPC decoders 312 then produce the reconstructed m data signals as output and feed-back extrinsic LLR information to the demapper 310.

The equivalent channel model for coherent detection, upon compensation of linear and nonlinear impairments and CPE, can be represented as:

$$r_k = s(a_k, \theta_k) + z_k,$$

$$r_k = [r_k^{(1)} \ldots r_k^{(i)} \ldots r_k^{(N)}]^T,$$

$$s(a_k, \theta_k) = e^{\theta_k}[a_k^{(1)} \ldots a_k^{(i)} \ldots a_k^{(N)}]^T, \text{ and}$$

$$z_k = [z_k^{(1)} \ldots z_k^{(i)} \ldots z_k^{(N)}],$$

where $r_k^{(i)}$ is the component of an observation vector at the $k^{th}$ symbol interval, $a_k^{(i)}$ is the $i^{th}$ coordinate of the transmitted symbol at the $k^{th}$ symbol interval, and $z_k$ is the corresponding noise vector with a Gaussian-like distribution of components. $\theta_k$ denotes the residual phase error at the $k^{th}$ time instance due to laser phase noise, nonlinear phase noise, and imperfect CPE. In polarization-division multiplexing (PDM), these equations apply to each polarization state. In 4-D signaling, the components above represent projections along in-phase and quadrature basis functions corresponding to the x- and y-polarizations. This model is applicable to few-mode fiber applications as well.

For example, to describe the laser phase noise and imperfect CPE, the Wiener phase noise model can be used:

$$\theta_k = (\theta_{k-1} + \Delta\theta_k) \bmod 2\pi,$$

where $\Delta\theta_k$ is a zero-mean Gaussian process with variance $\sigma_{\Delta\theta}^2 = 2\pi\Delta f T_s$, with $T_s$ denoting the symbol duration and $\Delta f$ denoting either linewidth or frequency offset. The cyclic slips can also be modeled by a Markov-like process of certain memory. The probability density function (PDF) of the phase increment above is given as:

$$p_{\Delta\Theta}(\Delta\theta_k) \sum_{n=-\infty}^{\infty} p(0, \sigma_{\Delta\theta}^2, \Delta\theta_k - n2\pi),$$

where $p(0, \sigma_{\Delta\theta}^2, \Delta\theta_k - n2\pi)$ denotes the Gaussian PDF of zero-mean, variance $\sigma_{\Delta\theta}^2$, and argument $\Delta\theta_k - n2\pi$. The resulting noise process is Gaussian-like, with the power spectral density of $N_0$, so that the corresponding conditional probability function is given by:

$$p_R(r \mid a_k, \theta_k) = \frac{1}{\pi N_0} e^{-\|r_k - s(a_k, \theta_k)\|^2 / N_0}.$$

For non-Gaussian channels, the method of histograms may be used instead to estimate the conditional probability density function $p_R(r|a_k, \theta_k)$.

The likelihood function may be defined as:

$$L(a_k, \theta_k) = \frac{p_R(r \mid a_k, \theta_k)}{p_R(r \mid a_k = 0)}.$$

If the sequence of $L=T/T_S$ statistically independent symbols, $a=[a_1 \ldots a_L]^T$, is transmitted, the corresponding likelihood function will be $$L(a, \theta) = \prod_{l=1}^{L} L(a_k, \theta_k).$$

To avoid numerical overflow problems, the log-likelihood function should be used instead, producing:

$$l(a,\theta) = \log(L(a,\theta)).$$

A maximum likelihood approach would lead to exponential increase in complexity as sequence length L increased. Other potential approaches have included factor graphs, expectation maximization, and blind turbo equalization. According to the present principles, however, a Monte Carlo method is used. In particular, the log likelihood function is calculated using the following numerical integration:

$$l(a) = \log(\int \ldots \int e^{l(a,\theta)} p\Theta(\theta) d\theta).$$

Instead of numerical integration, the present principles estimate the log likelihood function l as:

$$l(a) = \log(E_\theta(e^{l(a,\theta)})),$$

where the expectation averaging $E_\theta$ is performed for different phase noise realizations. This is particularly simple for memoryless phase noise processes, Wiener phase noise process, and cyclic slip phase noise processes described as Markov processes of reasonable memory. Expectation averaging is performed by generating a phase noise sample by a Monte Carlo method, calculating log-likelihood functions, and by averaging the likelihood function with respect to different phase noise realizations.

It can be shown that complexity of this method is $O((m^2+L)N_r)$, where m is the channel memory, L is the sequence length, and $N_r$ is the number of phase noise realizations. Compared to the maximum likelihood method, which has a complexity of $O(M^L)$, where M is the signal constellation size, the complexity of the present Monte Carlo method is significantly lower for long sequences. The Monte Carlo method uses the knowledge of Markov phase noise process, which can be characterized by training. In particular, for the Wiener phase noise process and the memoryless phase noise process, only the Gaussian noise generator is needed.

The present embodiments are directed specifically toward four-dimensional signaling, but it should be understood that other signaling schemes, such as few-mode fiber and PDM applications.

Figure 4:
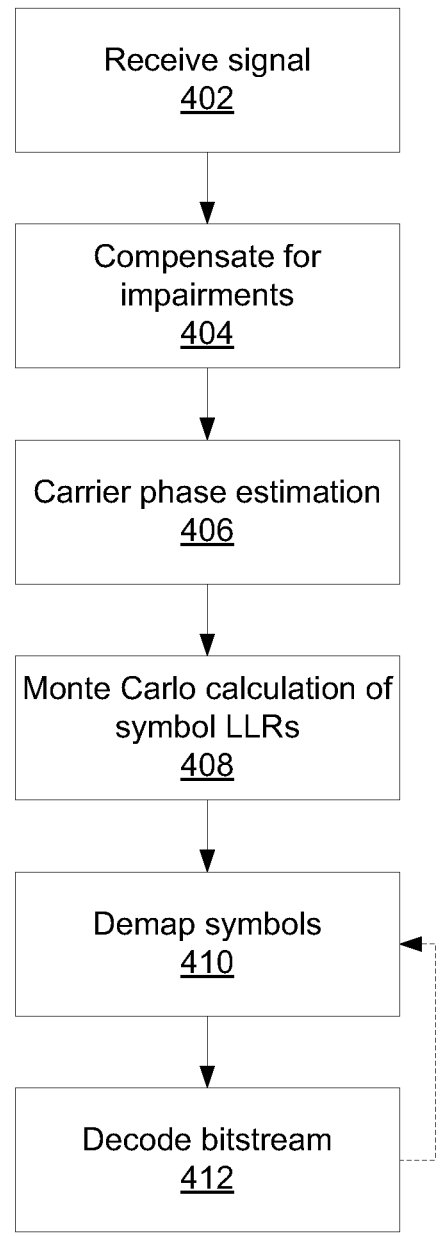
FIG. 4 is a block/flow diagram of a method of signal reception that uses Monte Carlo methods to calculate symbol log-likelihood ratios (LLRs) in accordance with the present principles.

Referring now to FIG. 4, a method for decoding received signals in the presence of residual CPE and imperfectly compensated channel impairments. Block 402 receives a signal as described above. It is specifically contemplated that the received signal may be an optical signal, but it should be understood that the present principles apply with equal force to other forms of information transmission. Block 404 compensates for linear and non-linear impairments in the channel. In the case of optical transmission, such impairments may include polarization mode dispersion, chromatic dispersion, and non-linear properties of the transmission fiber. Block 406 performs carrier phase estimation using any appropriate method, whether data- or non-data-aided. Upon compensation of these impairments and the performance of carrier phase estimation, however, there will be some residual phase error.

To address the residual phase error, block 408 calculates symbol LLRs to aid in demapping. Instead of using the standard numerical integration of log likelihoods, block 408 uses a Monte Carlo method, calculating the log likelihood function of a symbol a as $l(a) = \log(E_\theta(e^{l(a,\theta)}))$, where the expectation averaging $E_\theta$ is performed for different phase noise realizations and the function $l(a,\theta)$ is the logarithm of a likelihood function for the symbol a and the residual phase error $\theta$.

Block 410 uses the calculated symbol LLRs to demap the symbols 410 with, e.g., a four-dimensional constellation. Block 410 generates bit LLRs from the symbols, which block 412 decodes using an LDPC code. Block 412 determines extrinsic decoding information associated with the LDPC decoding and iterates that information back to block 410 to be used in reducing future decoding/demapping errors.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Having described preferred embodiments of a system and method for LDPC coded modulation for optical transport in the presence of phase noise (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:
1. A method for decoding a signal, comprising:
receiving the signal using an optical detector;
using a processor, compensating for impairments in the signal using at least carrier phase estimation, wherein residual phase error remains after said compensation;

using the processor, calculating symbol log-likelihood ratios (LLRs) for symbols in the compensated signal using Monte Carlo integration;

using the processor, demapping the symbols in the compensated signal using the symbol LLRs and extrinsic information from signal decoding to produce one or more estimated codewords; and using the processor, decoding each estimated codeword with a decoder that generates a decoded codeword and the extrinsic information.

2. The method of claim 1, wherein the LLR of a symbol a is calculated as:

$$l(a)=\log(E_\theta(e^{l(a,\theta)})),$$

where $E_\theta$ is an expectation average and $l(a,\theta)$ is a logarithm of a likelihood function for the symbol a and the residual phase error $\theta$.

3. The method of claim 2, wherein the expectation average $E_\theta$ is calculated by generating a phase noise sample with a Monte Carlo method, calculating log-likelihood functions, and by averaging the log-likelihood function with respect to different phase noise realizations.

4. The method of claim 1, wherein the received signal is a dual-polarization multiplexed optical signal.

5. The method of claim 4, further comprising converting the received dual-polarization multiplexed optical signal into electrical signals corresponding to respective in-phase and quadrature signals for each polarization before said step of compensating.

6. The method of claim 1, wherein demapping comprises comparing the symbols to a four-dimensional symbol constellation.

7. The method of claim 1, wherein compensating for impairments comprises compensating for polarization mode dispersion, chromatic dispersion, and fiber non-linearities.

8. A receiver, comprising:
a processor;
receiving circuitry coupled to the processor;
a compensation module executed by the processor configured to compensate for impairments in a received signal using at least carrier phase estimation, wherein residual phase error remains after said compensation;
a symbol log-likelihood module executed by the processor to calculate symbol log-likelihood ratios (LLRs) for symbols in the compensated signal using Monte Carlo integration;
a demapper executed by the processor configured to demap the symbols in the compensated signal using the symbol LLRs and extrinsic information from signal decoding to produce one or more estimated codewords; and
one or more decoders executed by the processor, each configured to decode an estimated codeword and to generate the extrinsic information that is fed back to the demapper.

9. The receiver of claim 8, wherein the LLR of a symbol a is calculated as:

$$l(a)=\log(E_\theta(e^{l(a,\theta)})),$$

where $E_\theta$ is an expectation average and $l(a,\theta)$ is a logarithm of a likelihood function for the symbol a and the residual phase error $\theta$.

10. The receiver of claim 9, where the expectation average $E_\theta$ is calculated by generating a phase noise sample with a Monte Carlo method, calculating log-likelihood functions, and by averaging the log-likelihood function with respect to different phase noise realizations.

11. The receiver of claim 8, wherein the received signal is a dual-polarization multiplexed optical signal.

12. The receiver of claim 11, further comprising a detector configured to convert the received dual-polarization multiplexed optical signal into electrical signals corresponding to respective in-phase and quadrature signals for each polarization before passing said electrical signals to the compensation module.

13. The receiver of claim 8, wherein the demapper is configured to compare the symbols to a four-dimensional symbol constellation.

14. The receiver of claim 8, wherein the compensation module is configured to compensate for polarization mode dispersion, chromatic dispersion, and fiber non-linearities.

* * * * *